BEST AVAILABLE COPY

Sept. 3, 1940. F. BAIN Re. 21,546

CIGAR LIGHTER

Original Filed Oct. 16, 1926 2 Sheets-Sheet 1

INVENTOR
Forée Bain
BY
Arthur A. Johnson
ATTORNEY

BEST AVAILABLE COPY

Sept. 3, 1940. F. BAIN Re. 21,546

CIGAR LIGHTER

Original Filed Oct. 16, 1926 2 Sheets-Sheet 2

INVENTOR
Florée Bain
BY Arthur A. Johnson
ATTORNEY

BEST AVAILABLE COPY

Reissued Sept. 3, 1940

Re. 21,546

BEST AVAILABLE COPY

UNITED STATES PATENT OFFICE 21,546

CIGAR LIGHTER

Forée Bain, deceased, late of La Grange, Ill., by Casco Products Corporation, mesne assignee, Bridgeport, Conn.

Original No. 1,657,189, dated January 24, 1928, Serial No. 141,904, October 16, 1926. Application for reissue January 7, 1939, Serial No. 250,077

10 Claims. (Cl. 219—32)

The invention relates to improvements in cigar lighters.

One of the objects of the invention is to make an electric cigar lighter which when sufficiently heated, may be disconnected entirely from an electric heating circuit and which may then be passed around for use without respect to the circuit which energized the heated element thereof.

Another object is to provide a cigar lighter in two separable members, the fixed one of which carries suitable circuit terminals for cooperative terminals carried by the separable member and the separable member carries an auxiliary switch which is closed by rotation of the separable member before separation of the members.

Another object is to provide a cigar lighter in two separable members, the fixed one of which carries the circuit terminals and the other member of which carries the heated element cooperating terminals and an independent electric switch, said members being entirely disconnected from each other when the heated member is being used for its intended purpose.

Another object is to provide a two-part cigar lighter in which the removable member carries an element to be heated and in which said element is connected to a relatively large body of metal in which to store heat at the time said element is being heated and which will impart its heat to the heated element when said separable member has been disconnected from the fixed member of the device, to thereby increase the duration of time that said heated element may remain in operable service.

Other objects, advantages, refinements and benefits will become apparent to persons skilled in the art from a consideration of the following description and the drawings forming a part hereof, wherein On the drawings.

As shown on the drawings.

In all of the views the same reference characters indicate similar parts.

The lighter consists of two separable members, one said member carrying circuit terminals and arranged to be fixed to a wall or other suitable support.

The other member is detachable from the fixed member, being entirely disconnected therefrom, carries an igniting element which is heated during its association with the fixed member as a result of closing an independent switch carried by said detachable member by rotation of said member and which is utilized for lighting cigars during the time when it is detached and while sufficient heat for the purpose persists in the igniting element.

The two cooperating members are each provided with a pair of coacting electric terminals that may easily be separated when the detachable member is taken from the fixed member and a spring-operable switch is carried by the detachable member for closing an electric circuit thru said igniting element by rotation of the detachable member when the two members are connected together at their terminals.

The spring tends to always yieldingly open the switch when the biased part is released.

The fixed stationary member 15, takes the form of a receptacle, and serves as an outlet for an electric circuit which is intended to be connected to the terminals 16 and 17 on wires 16' and 17'. These terminals are properly mounted on a suitable plate 18, which may be attached to a wall, or other support, by screws passing thru openings 19.

The branch wires 16' and 17' from an electric circuit come in thru openings 20—21 and enter the terminals 16 and 17.

Figure 2:
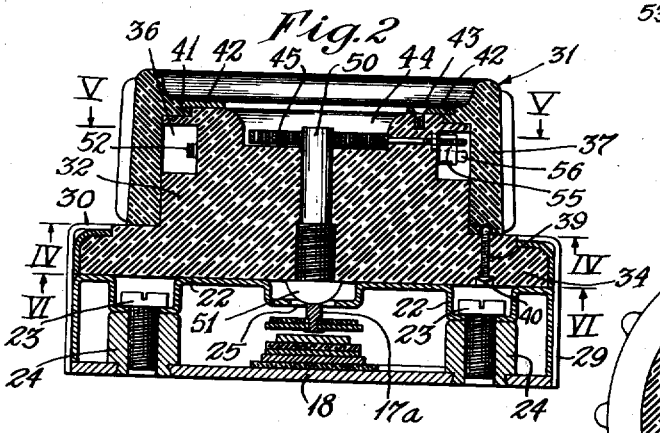
Figure 2 is an enlarged diametric section taken substantially on line II—II of Figure 1.
Figure 4:
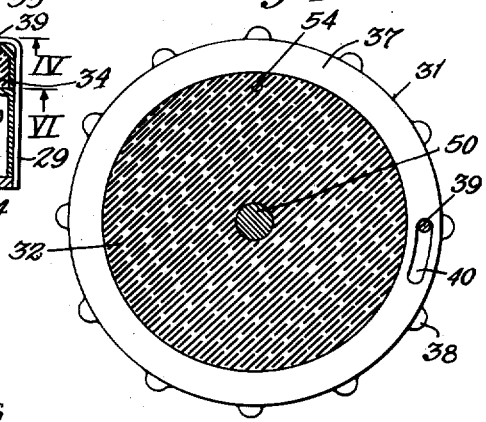
Figure 4 is a section on line IV—IV of Figure 2.
Figure 5:
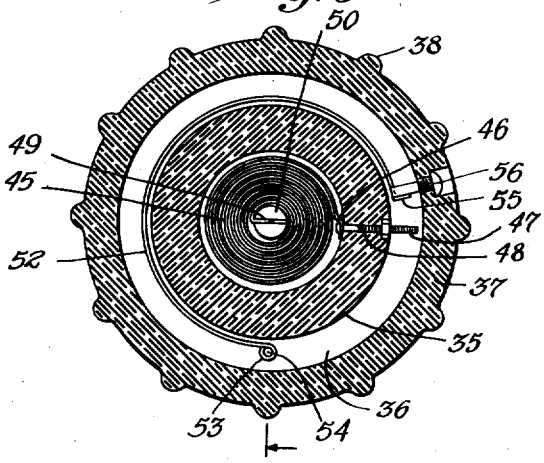
Figure 5 is a section taken on line V—V of Figure 2.
Figure 6:
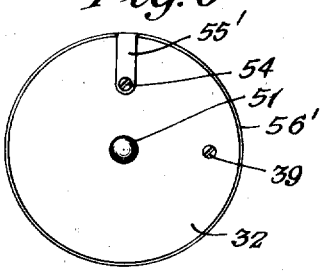
Figure 6 is a reduced bottom plan view as seen of one of the members on line VI—VI of Figure 2.
Figure 7:
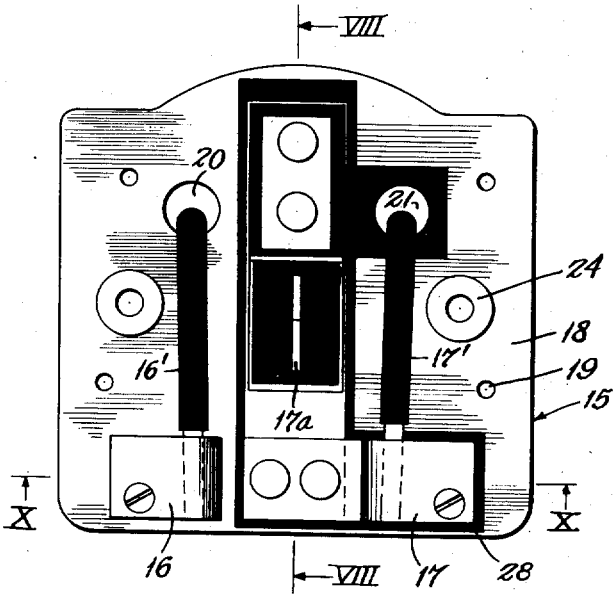
Figure 7 is the terminal-carrying plate to be fixed to the wall.
Figure 8:
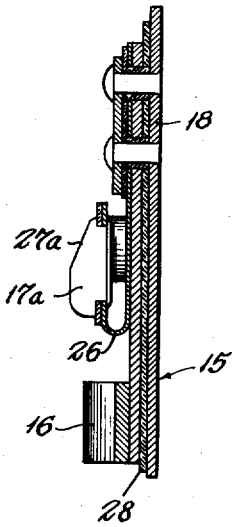
Figure 8 is a section on line VIII—VIII of Figure 7.
Figure 9:
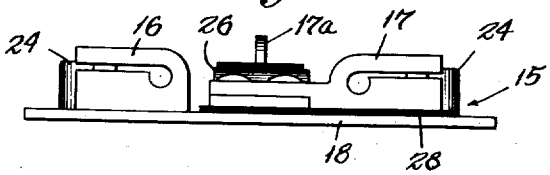
Figure 9 is a bottom end view of Figure 7.
Figure 10:
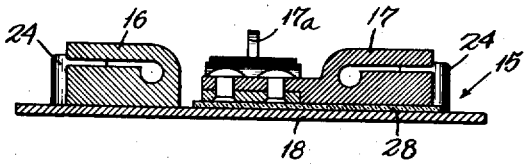
Figure 10 is a section taken on line X—X of Figure 7.

In Figure 2 a cover plate 22 overlies the plate 18 and is secrewed thereto by screws 23 which pass into internally threaded studs 24 that are fixed to plate 18. The blade-like terminal 17a passes thru an orifice 25 in the plate 22 which is large enough to prevent contact therewith.

The contact blade 17a is mounted on a spring blade 26 so as to slightly yield when pressure is applied thereto. The blade 17 is tapered at 27a for a purpose to be presently described.

The fixed part of the terminal 17 and the

BEST AVAILABLE COP' plate are insulated by an L-shaped strip of insulating material 28.

Figure 11:
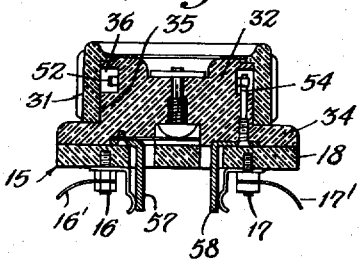
Figure 11 is a modification of Figure 2 and may be the preferred form.

In Figure 11 the entire plate 18 may be made of insulating material.

Figure 1:
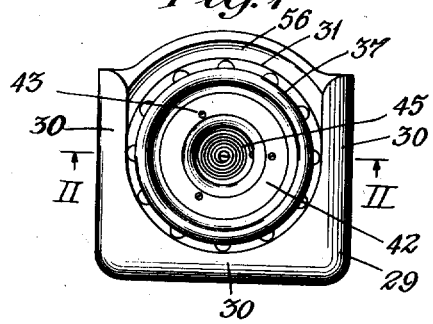
Figure 1 shows a front elevation of one form of the device, with the two members assembled for service.

In the form shown in Figures 1 and 2 a hood 29 overlies the edges of the cover plate 22 and is flanged at 30 to retain the detachable member 31 in place.

The detachable member 31 is shown as made of insulating material.

This member in all essential respects is also shown in Figure 11.

It is shown as consisting of a block of insulating material 32 having an annular flange 34 extending radially from and around its bottom edge.

The part 35 is round and contains an annular groove 36. A ring 37, of insulating material, is freely rotatable on the part 35 and overlies the groove 36. It has circumferentially spaced ribs 38 to facilitate rotation of the ring.

A screw 39 extends thru the flange 34 into an arcuate slot 40 made into the bottom edge of the ring 37 to limit the extent to which the ring may be rotated.

The ring 37 has an inner directed flange 41 over which ring 42 is secured to the fixed part 32 by screws 43. This permits rotation of the ring 37 and prevents its removal from the part 32.

The part 32 is counterbored to form a cavity 44 in its end. There is a spirally wound wire 45 constituting the igniting element, and which is to be heated by the electric current, in the cavity.

The outer end 46 of the igniting element 45 is connected to a switch plate 47, located in the groove 26, by a screw 48. The inner end 49 of the igniting element is connected to a large screw 50 which in Figure 2 has a projecting button head 51. In Figure 11 the head of this screw may be counter-sunk, as shown.

The screw is made large and preferably of copper to hold and conserve heat in order to extend the time period that the igniting element may remain serviceable after it has been separated from the fixed receptacle member 15.

The screw will serve as a heat reservoir and maintain the coil 45 at its high temperature for a protracted period of time.

A curved spring blade 52 is located within the groove 36 to open the switch between contacts 47 and 55. The end 53 is connected to a screw 54.

The screw 54 is connected to the terminal 17 of the fixed member when the parts are assembled as will be presently shown and as clearly apparent in Figure 11.

Wires 16' and 17' lead to and constitute a part of the circuit leading to the current supply.

The spring 52 has its free end outturned to form contact plate 55 which is engaged by a screw 56 which passes thru the ring 37 into the groove 36.

The fixed plate 47 and the movable plate 55 constitute the terminals of an electric switch for closing circuit thru the igniting element 45 when the ring 37 is rotated clockwise until these plates are brought into contact, one with the other, after the detachable member has been placed in operating position with the fixed members as shown in Figures 1, 2 and 11.

Figure 3:
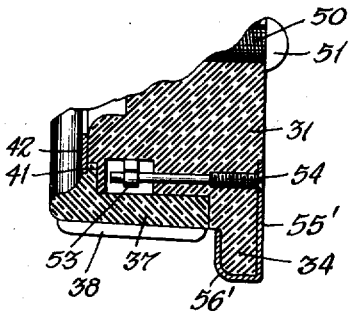
Figure 3 is a fragmentary detail of Figure 1.

In the form shown in Figures 1 to 3 inclusive, a metal rim 56' surrounds the flange 34 and makes electrical contact with the flange 30 of the hood 29 to complete the electric circuit from the end 55 of the spring blade 52, thru screw 54 over connector 55' to the rim 56'.

In Figure 11 the terminals of the detachable member 31 take the form of angular strips 57 and 58 which may be spaced to cooperate with the circuit terminals 16—17 of a standard fitting.

The operation of the device is simple. The ring 31 is rotated clockwise until the switch terminals 47 and 55 are brought together, this closes the electric circuit thru the igniting element 45 which is heated. In the meantime the large screw 50 absorbs some heat. It cannot part with its heat to the surrounding atmosphere as quickly as the element 45 because it has very little surface exposed.

When the element 45 becomes practically incandescent the detachable member 31 carrying the igniting element is entirely removed from the fixed member 15 and used to light cigars. Owing to the persistence of heat of the heated parts a very considerable time expires before the igniting element becomes sufficiently cool to be no longer of service.

When the two members 15 and 31 are separated the spring 52 automatically opens the switch.

The detachable member 31 in the illustrated embodiment shown in Figure 1, is detached from the fixed member 15 by raising the former out of the hood 29. The frictional engagement of these parts is sufficient to permit the ring 37 to be rotated without rotating the entire element 31.

In Figure 11 the member 31 may be separated from the member 15 by pulling it straight out, as in other similar, but standard devices. The detachable element shown in Figure 11 is substantially the same as that shown in Figures 1 and 2 with the exception that the terminals 16 and 17 differ somewhat in configuration to adapt the device for use with the fixed member with which it may be associated.

What is claimed is:

1. An electric cigar lighter including two separable members; an igniting element carried by the removable member; an electric circuit including said element; cooperating circuit terminals carried by said members arranged to be separated when said members are separated; and a switch carried by the removable member and operable by relative rotative movement of a portion of the removable member which is grasped to separate said members with respect to the remainder of the removable member.

2. An electric cigar lighter including two separable members; an igniting element carried by one member; an electric circuit including said element, passing through both members for heating said element, interrupted when the members are separated; and a switch to close said circuit when said members are in assembled relation, said switch being closed by rotative movement of a portion of said separable member which is grasped to manipulate the separable member and which is rotatable with respect to the remainder of said separable member.

3. An electric cigar lighter including two electrically separable members, one of said members to be relatively fixed and the other member detachable therefrom; an igniting element carried by the detachable member; an electric circuit common to both members; and a switch carried by the detachable member and operable by rotatable movement of a portion of said member with respect to the remainder thereof to close said circuit, to heat said element before

BEST AVAILABLE COP' separation of said members, said portion forming a handle by which the detachable member is grasped for removal.

4. An electric cigar lighter including two electrically separable members, one of said members to be relatively fixed and the other member having a portion by which it is gripped to be detachable therefrom; an igniting element carried by the detachable member; an electric circuit common to both members; and a switch on the detachable member operable to close said circuit for heating said element before separation of said member, the portion of the detachable member which is to be gripped to remove the same being operated to close said switch.

5. An electric cigar lighter including two electrically separable members, one of said members to be relatively fixed and the other member detachable therefrom; an igniting element carried by the detachable member; electric circuit terminals on the fixed member; cooperating terminals on the detachable member; an electric circuit common to both members and including the igniting element; an electric switch to close said circuit for heating said element carried by the detachable member; and a member to be grasped to manipulate said detachable member rotatably mounted on the detachable member and rotated to close said switch before said members are separated.

6. On electric cigar lighter including two electrically separable members, one of said members to be relatively fixed and the other member having a handle whereby it can be manually separated therefrom; an igniting element carried by the detachable member; an electric circuit common to both members and said element; a switch on the detachable member to close said circuit for heating said element before said members are separated, said switch being closed by operation of the handle; and a spring to automatically open said switch when said closing means is released.

7. An electric cigar lighter including two electrically separable members, one of said members to be relatively fixed and the other member detachable therefrom, said detachable member comprising essentially two relatively movable parts; an igniting element carried by one of said relatively movable parts; a handle carried by the other of said movable parts to be gripped for removing and manipulating the detachable member; cooperative electric circuit terminals arranged for separation and carried by said members; an electric circuit common to both members and said element; an electric switch interposed between the two parts of the detachable member to close said circuit to heat said element before separation of the members, movement of the handle relative to the igniting element closing the switch between the relatively movable parts; and a spring normally urging the parts to open the switch.

8. An electric cigar lighter including a member having a round body part; a ring overlying said body part, rotatable to close a switch; an igniting element mounted on one end of the body part and within said ring; a spring to return the ring to a predetermined position and a switch operable by rotation of the ring against the action of the spring to close said switch to heat said element.

9. An electric cigar lighter including a member having a round body part and an annular groove and rotatable to close a switch; a curved spring in said groove, one end of which is attached to the said body part and the other end to the ring to return the ring to a predetermined position; means to limit the extent of the movement of said ring; an igniting element carried on said body part; and a switch operable by rotation of said ring to close said switch for energizing said igniting element.

10. An electric cigar lighter including a member for detachment from an electric circuit and having terminals for attachment to a circuit, said member having a handle whereby it can be manipulated, the handle being mounted on the detachable member for relative movement with respect thereto; an igniting element carried by the member; an electric switch to close the circuit through said element to heat the latter when said terminals are attached to a circuit, the handle being movable relatively to said member to close said switch; and a spring to return said handle to normal open-circuit position.

CASCO PRODUCTS CORPORATION,
*Assignee of Forée Bain, Deceased.*
By D. J. McCARTHY,
*Secretary.*